UNITED STATES PATENT OFFICE.

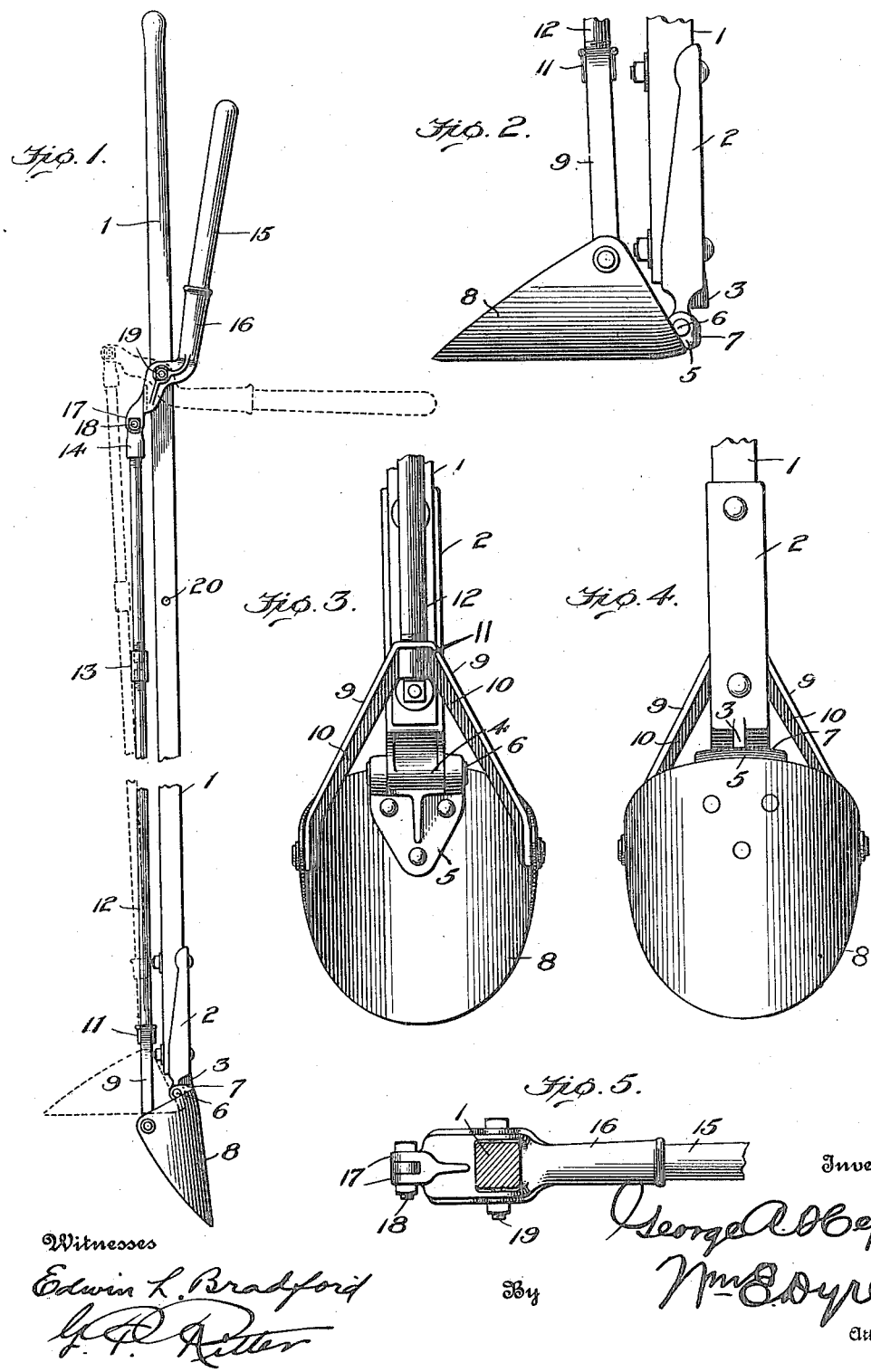

GEORGE A. HEPP, OF OMAHA, NEBRASKA, ASSIGNOR OF ONE-HALF TO PHILIP FORAN, OF OMAHA, NEBRASKA.

POST-HOLE DIGGER.

1,128,137.   Specification of Letters Patent.   Patented Feb. 9, 1915.

Application filed December 23, 1912. Serial No. 738,264.

*To all whom it may concern:*

Be it known that I, GEORGE A. HEPP, a citizen of the United States, residing at Omaha, in the county of Douglas and State of Nebraska, have invented certain new and useful Improvements in Post-Hole Diggers; and I do hereby declare the following to be a full, clear, and exact description of the invention, such as will enable others skilled in the art to which it appertains to make and use the same.

My invention relates to excavating implements or post hole diggers, more especially to that class of diggers having a pivoted jaw or shovel-blade under control of a hand actuated lever for elevating dirt from holes in the course of digging.

It has for its object the production of implements of the character indicated of superior mechanical construction, a digger which is at once simple and durable, not likely to become deranged, and more efficient in its use and operation generally than others at present known to the trade.

The invention will be hereinafter particularly described and pointed out in the claims following.

In the accompanying drawings which form part of this application, and whereon corresponding numerals refer to like parts wherever they occur: Figure 1 represents a side elevation of my invention with parts shown in the normal digging position, their lifting or dirt excavating position appearing in dotted lines. Fig. 2 is also a side elevation, upon a relatively enlarged scale, showing the lower end of my invention with its shovel blade in a lifting position with respect to the handle. Fig. 3 is a front elevation of the shovel-blade and connections when in a digging position. Fig. 4 a rear elevation or a back view of parts shown by Fig. 3; and, Fig. 5 is a fragmentary plan view of an operating lever in the position indicated by dotted lines in Fig. 1, the main handle being shown in section.

Reference being had to the drawings and numerals thereon, 1 indicates the handle of a post-hole digger having bolted to its lower end a trough-shaped forging, malleableized casting or pressed steel fitting 2, having a centrally positioned spur or abutting surface 3, and a downwardly extending perforated cylindrical hinge member 4 as shown. Mating with the hinge member 4 is another hinge member 5 preferably of sheet metal pivotally connected to the former by a through pin 6 and provided upon its upper edge in rear of said pin with a flattened abutting surface 7 for mutually coacting with the spur or abutting surface 3 to receive all thrusts during the digging operation.

To the back of hinge member 5 is securely attached by rivets or otherwise, a cutting-blade or scoop 8 of sheet metal, arranged and adapted by reason of the abutting surfaces 3 and 4, to occupy a cutting position at an angle to its supporting handle 1, so that the central portion of the cutting edge of said blade 8, when in a cutting position, stands back of a plane passing through its pivotal connection and parallel with said handle as shown by Fig. 1.

To the opposite sides or upper corners of blade 8 are pivotally connected the ends of a yoke 9 made of suitable material, and if desired, reinforced by a flange 10; this yoke is provided at its apex with a boss 11 screw-threaded upon its interior, and into the latter is threaded the lower end of an uprising operating rod 12 as shown by Figs. 1, 2 and 3. The said rod 12 is a sectional rod for purposes of adjustability, made of two sections connected by a screw-threaded union 13, and having a terminal coupling 14 adapted to be attached to either of said rod sections by a screw-threaded connection, as shown.

Upon the main handle 1 is pivotally mounted a hand operating lever 15 the same being secured by means of a socketed fitting of suitable metal 16 which loosely surrounds said handle, as best shown by Fig. 5, and terminates in a pair of forwardly projecting lugs 17 between which latter the flattened extremity of the coupling 14 before mentioned is received, this connection being completed by an ordinary through bolt 18. In like manner the fitting 16 is then pivotally connected to the handle 1 by means of bolt 19, in either of its selective positions, that is to say as shown by Fig. 1 when providing for post holes of unusual depth, or by passing through the lowermost hole 20 when providing for post holes of ordinary depth.

This being substantially the arrangement and construction of my invention its use and operation are quite obvious and need not be herein dwelt upon at length. It may be noted, however, that the implement is equally effective when used either with or without the extension member of operating rod 12, and in any event, during the digging operation, it receives all thrusts directly and exclusively upon the abutting surfaces 3 and 7, thereby relieving said rod 12 of such, and effecting a material saving upon its movable connections. Moreover, in this particular construction it is optional with the operator whether he grasps handle 1, or both handle 1 and lever 15 during the digging operation, for the reason that the cutting-blade 8 is normally presented in operative position as shown by Fig. 1 of the drawings, its abutting surfaces 3 and 7 being held in contact by the overbalancing weight of the operating rod 12 and its connections upon the opposite side of pivot pin 6. The operation of shoveling and lifting the loosened earth from a post hole is also quite apparent, same being readily accomplished by depressing the hand lever 15 to the position indicated by dotted lines, which results in elevating the scoop or blade 8 into a lifting position with respect to the handle 1, whereupon the entire implement may be withdrawn bodily from the post hole together with the loosened earth and materials resting upon said scoop or blade at the time.

It is of course understood that I do not limit myself to the particular form and arrangement of parts herein shown and described, nor to any particular material or materials employed, but The foregoing being a description of my invention in the best form of construction at present known to me, what I now claim and desire to secure by Letters Patent is:

1. In a post hole digger the combination with a handle having a pivotally connected shovel-blade the central portion of the cutting edge whereof when in a cutting position is angularly disposed with respect to the handle and stands back of a plane passing through the pivotal connection and parallel with said handle, of abutting surfaces upon both handle and blade which mutually receive all thrusts during the digging operation, a lever pivotally mounted upon the handle, and operative connections between said lever and shovel blade whereby the latter may be thrown into a lifting position with respect to the handle.

2. In a post hole digger the combination with a handle having a pivotally connected shovel-blade, the central portion of the cutting edge whereof when in a cutting position is angularly disposed with respect to the handle and stands back of a plane passing through the pivotal connection and parallel with said handle, of a lever pivotally mounted upon said handle and adjustable as to height thereon, a sectional operating rod interposed between said lever and shovel-blade whereby the latter may be thrown into a lifting position with respect to the handle, and means for adjusting the length of said operating rod to correspond with the adjusted positions of the lever by which it is operated.

In testimony whereof I affix my signature, in presence of two subscribing witnesses.

GEORGE A. HEPP.

Witnesses:
E. R. HUME,
A. A. MORRISON.